United States Patent [19]

Millay et al.

[11] Patent Number: 4,870,786
[45] Date of Patent: Oct. 3, 1989

[54] WORKSTOCK

[75] Inventors: Lawrence I. Millay, Springfield; Guenther F. Burgbacher, Proctorville, both of Vt.

[73] Assignee: Bryant Grinder Corporation, Springfield, Vt.

[21] Appl. No.: 214,306

[22] Filed: Jul. 1, 1988

Related U.S. Application Data

[63] Continuation of Ser. No. 914,035, Nov. 1, 1986, abandoned.

[51] Int. Cl.$^4$ ............................................. B23B 23/04
[52] U.S. Cl. ............................. 51/281 R; 51/237 R; 82/1.11; 82/142; 82/151; 82/150
[58] Field of Search ........... 51/165.74, 165.75, 165.76, 51/165.77, 165.78, 237 CS, 237 R, 236, 103 C, 281 R; 82/28 R, 33 A, 33 R, 2 B, 2 C, 28 R, 31, 1 C, DIG. 4, DIG. 5, DIG. 6, 142, 150, 151, 118, 119, 148, 1.11

[56] References Cited

U.S. PATENT DOCUMENTS

| | | | |
|---|---|---|---|
| 1,299,208 | 4/1919 | Müller | 82/31 |
| 1,380,139 | 5/1921 | Greaves | 82/31 |
| 1,815,562 | 7/1931 | Godfriaux | 82/DIG. 6 |
| 4,116,094 | 9/1978 | Dombrowski | 82/2.5 |
| 4,254,676 | 3/1981 | Wilson | 82/28 R |
| 4,294,045 | 10/1981 | Enomoto | 51/165.77 |
| 4,625,461 | 12/1986 | Vetter | 82/31 |

FOREIGN PATENT DOCUMENTS 0358353 12/1961 Switzerland .................. 279/1 E

Primary Examiner—Robert P. Olszewski
Assistant Examiner—Blynn Shideler
Attorney, Agent, or Firm—Edward J. Timmer

[57] ABSTRACT

The workstock may comprise a tailstock having a slide which releasably carries a workpart center and which includes a center ejector member independently movable in the slide. The slide is mounted in a housing for axial motion toward and away from a headstock center to load and unload a workpart therebetween. The axial position of the slide as well as the center ejector member is monitored by position sensors to provide status of the tailstock center and workpart. The workpart center is loosened by the ejector member in the slide when the ejector member is positioned from a retracted position relative to the pocket to a center eject position toward the pocket so that a robot may remove the center and substitute another center to hold a different workpart.

10 Claims, 3 Drawing Sheets

WORKSTOCK

FIELD OF THE INVENTION

The invention relates to workstock, such as tailstock and headstock, constructions between which a workpart is held for machining or performance of other operations thereon.

BACKGROUND OF THE INVENTION

With the advent of flexible manufacturing systems wherein robots or other automated devices exchange tools, workparts and workpart support fixtures such as headstocks and tailstocks, there is a need to provide a headstock or tailstock (hereinafter "workstock") which is adaptable for use in such flexible manufacturing systems in that the workstock is readily interchangeable by robotic or other automated means and can interface with the system control computer to provide status of the workstock.

SUMMARY OF THE INVENTION

The invention contemplates a workstock constructed to fill this aforementioned need.

The invention contemplates a workstock having a center-carrying slide for releasably holding a workpart center and having an ejector mechanism independently movable therein for freeing the center from releasable engagement in the slide for removal by a robot or other means.

The invention further contemplates a workstock wherein a center-carrying slide is hydrostatically or otherwise supported for longitudinal sliding movement and wherein the position of the center-carrying slide as well as position of a center ejecting member in the slide is monitored by appropriate position sensors to provide feedback to the control computer regarding status of the workstock.

DESCRIPTION OF PREFERRED EMBODIMENTS

Figure 1:
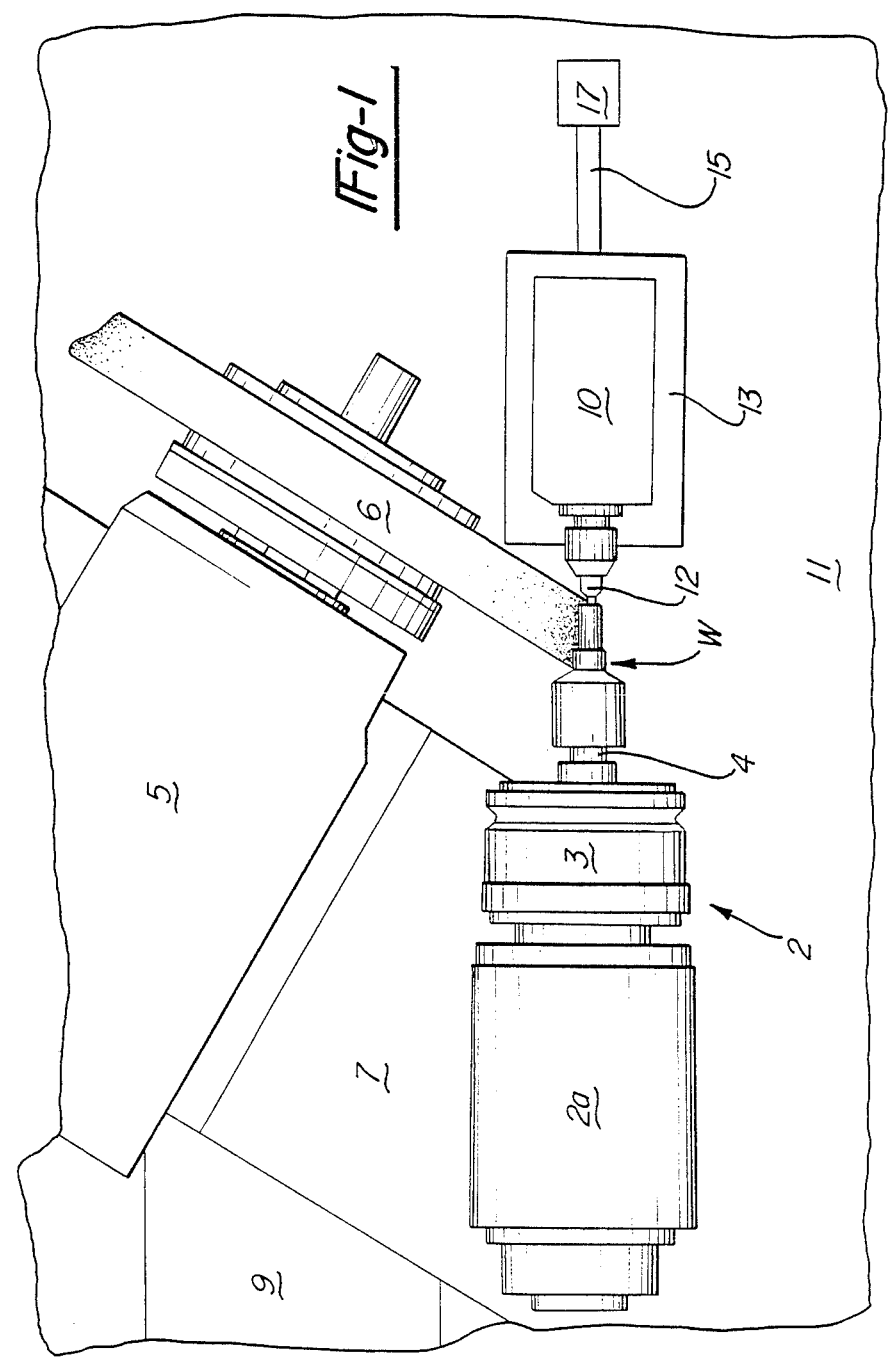
FIG. 1 is a plan view of a grinding machine having a headstock and tailstock, the latter constructed in accordance with the invention.

FIG. 1 shows a grinding machine having a headstock 2 with headstock center 4. A drive motor 2a rotates a headstock chuck 3 itself releasably holding center 4 that is received in one end of workpart W. Grinding wheel 6 is shown against the workpart to grind same while it is held between headstock 2 and tailstock 10 and rotated by motor 2a. Tailstock 10 has a dead (non-rotating) tailstock center 12 releasably held therein. Of course, tailstock center 12 can be also rotatably mounted as a live center. Wheel 6 is rotated by motor 5 carried on compound slides 7, 9. It is apparent that headstock center 4 and tailstock center 12 are in spaced opposing relation and the centers are coaxial.

Figure 3:
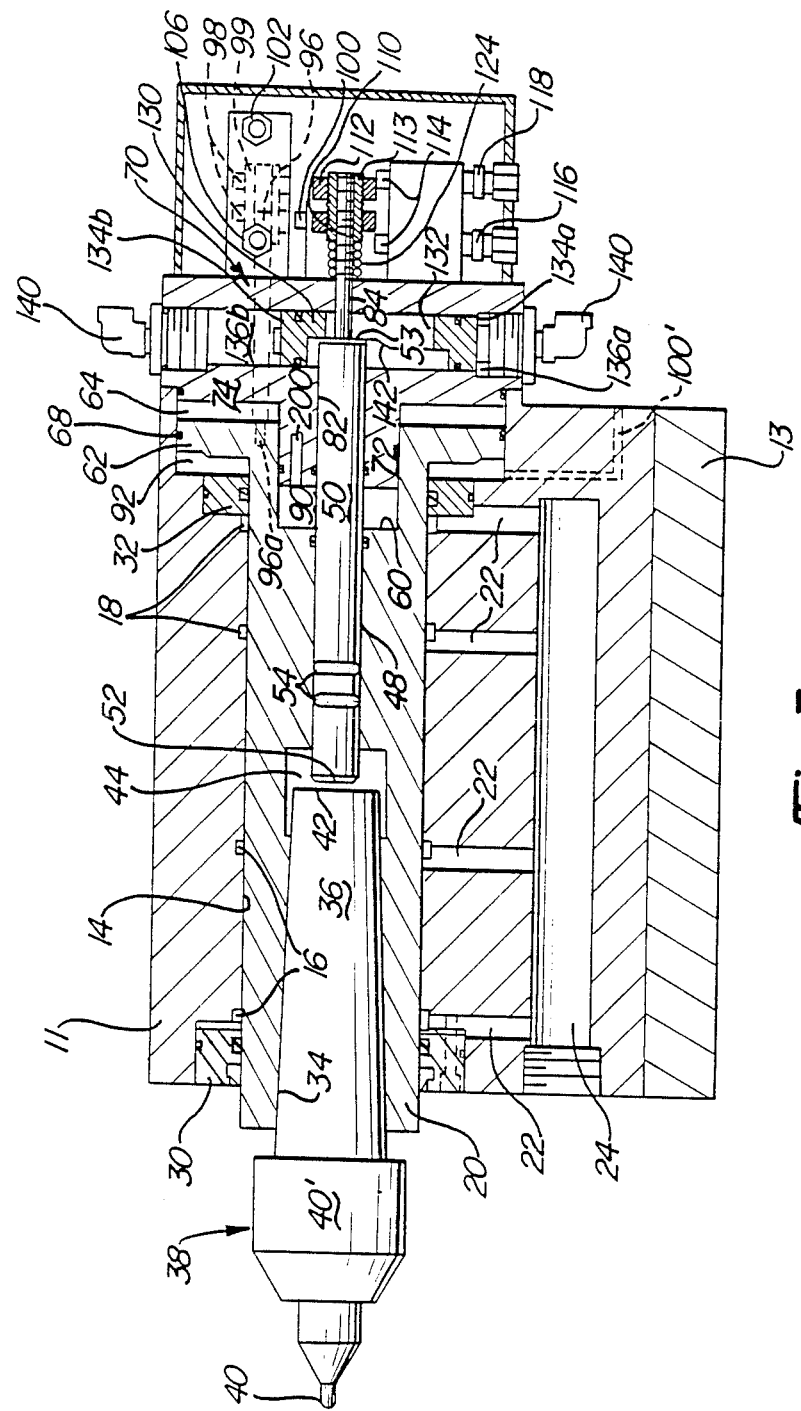
FIG. 3 is a longitudinal cross-section taken along lines 2—2 of FIG. 2.

FIGS. 3 illustrates the tailstock 10 constructed in accordance with the invention. Generally, the tailstock 10 is affixed to a slide 13 driven by a ball screw 15 and servomotor 17 on machine bed or base 11 and is spaced longitudinally or axially from the associated headstock 2 for holding workpart W between the headstock and tailstock. Movement of tailstock 10 on slide 13 provides gross movement necessary to re-position the tailstock within a certain range of motion for different workparts. Minor motion to load and unload workparts is effected by components of tailstock 10 with slide 13 fixed in position during loading and unloading.

The tailstock 10 includes a housing 11 having a cylindrical annular longitudinal or axial bore 14 and two pairs of annular grooves 16, 18 forming hydrostatic bearings for cylindrical slide 20. Each groove of each pair 16, 18 receives or returns hydraulic or other fluid via transverse passages 22 connected to one or the other of two common axial passages 24 connected to a suitable external source of pressurized fluid.

As a result of the hydrostatic mounting of cylindrical slide 20, it can be moved longitudinally or axially (left and right in FIG. 3) in housing 11 to rotatably support the workpart W at that end. Suitable o-ring seals are provided in collars 30, 32 in the housing for fluid sealing purposes.

The cylindrical slide 20 includes a slightly conical or inwardly tapered pocket 34 at its forward end to receive and frictionally retain a similarly shaped or tapered shank 36 of a workpart center 38. Center 38 includes a pointed or sharply rounded end 40 for engaging the workpart W. In automated machining cells or systems different workpart centers 38 are used for different workparts or machining operations and thus are interchanged when a different workpart is to be machined or different machining operation is to be performed. The centers 38 include an intermediate enlarged gripped portion 40 by which a robot gripper (not shown) can grip the center to remove it from pocket 34 of the tailstock slide 20 and to insert the shank of the replacement center into the pocket 34.

As is apparent, when positioned in pocket 34, the end 42 of center shank 36 extends into an enlarged cylindrical bore 44 which communicates which pocket 34.

Another smaller cylindrical longitudinal bore 48 extends axially from bore 44 and receives a cylindrical ejector member or rod 50. Rod 50 has end 52 spaced from the end 42 of the shank 36 when the ejector member is spring biased to the retracted position relative to pocket 34 as shown in FIG. 3. Ejector rod 50 includes a pair of o-ring fluid seals 54, while housing includes collars 30, 32 with o-ring fluid seals for fluid sealing purposes.

The cylindrical slide 20 includes a counterbore 60 in the inner end communicating with smaller axial bore 48 and terminates in a radially or transversely extending piston 62 which is disposed in counterbore 64 in housing 11 as shown. The piston 62 carries an o-ring 68 to fluid seal against the wall of the counterbore 64.

Counterbores 60, 64 are closed off by end cap 70 having cylindrical portion 72 extending axially part way into counterbore 60 and flange portion 74 extending axially part way into counterbore 64. O-ring seals on portions 72, 74, respectively, provide desired fluid sealing. As shown, ejector rod 50 extends through coaxial bores 82, 84, in end cap 70 for purposes to be explained. Of course, bores 82, 84, are coaxial with bore 44 in cylindrical slide 20.

Figure 2:
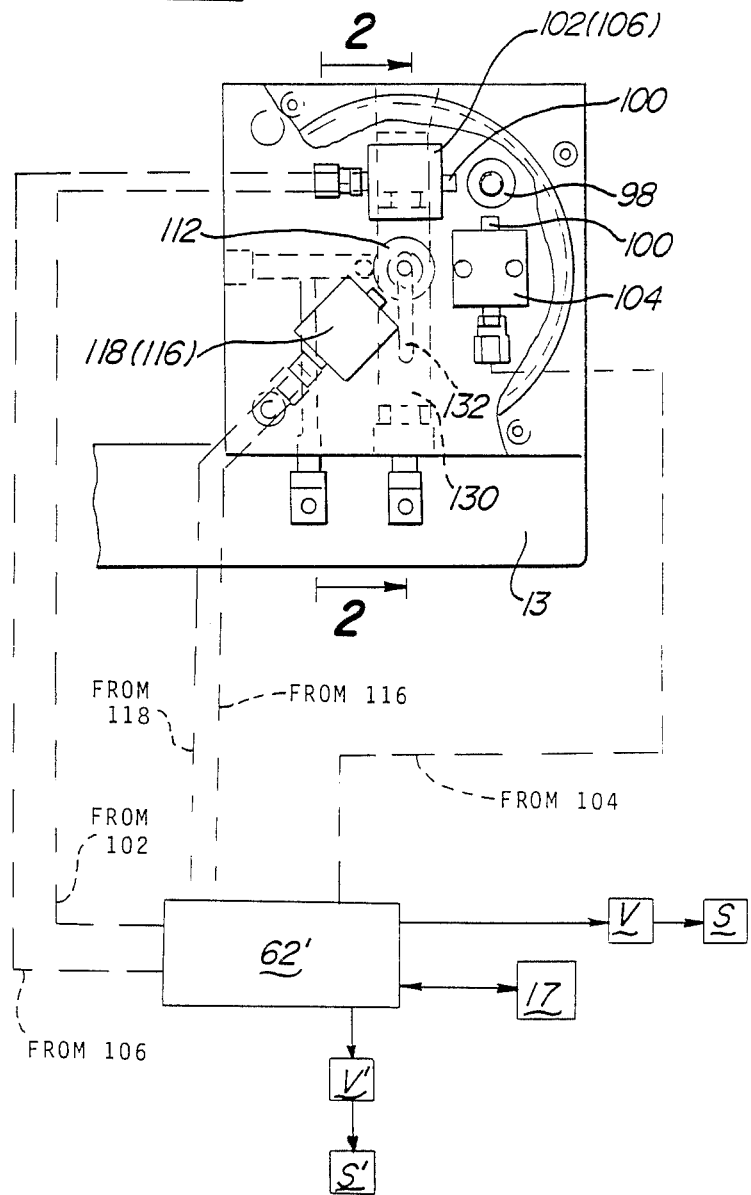
FIG. 2 is an end elevation of a tailstock constructed in accordance with the invention.

Fluid chambers 90, 92 are thus defined in counterbores 60 and 64, respectively, for alternately receiving pressurized fluid from fluid pressure source S to actuate cylindrical slide 20 to slide in FIG. 3 toward collar 30 to extend the center and slide or in the appropriate direction to retract same. In particular, chamber 90 receives pressurized fluid through passage 200 in portion 72 of the end cap connected to an external fluid pressure source S with chamber 92 open to return to cause slide 20 to move to the left in FIG. 3. Similarly, chamber 92 receives pressurized fluid through passage 100' in housing 11 connected to an external fluid pressure source (not shown) with chamber 90 open to return to cause slide 20 to move to the right in FIG. 3. Computer control 62' controls pressurization of chambers 90, 92 by controlling appropriate valving V, FIG. 2 interposed between the source S and chambers 90, 92.

Extending axially from piston 62 rearwardly through flange portion 74 is a shaft 96 carrying axially spaced annular sensed members 98 on a hub 99 past axially spaced sensor members 100 of position proximity switches or transducers 102, 104, 106 carried on end cap 70 as shown in FIG. 3 for purposes to be explained below. Shaft 96 includes end 96a threaded into piston 62.

Extending axially from ejector rod 50 is a reduced diameter cylindrical shaft 110 carrying axially spaced annular sensed members 112 on a hub 113 past axially spaced sensor members 114 of position proximity switches or transducers 116, 118 for purposes to be explained below.

The ejector rod 50 is biased to the retracted position shown in FIG. 3 (inoperative or unactuated position) by coil spring 124 disposed between end cap 70 and hub 113.

The ejector rod 50 is moved from its inoperative or retracted position of FIG. 3 (which exists during machining of the workpart) to an actuated center eject position in the slide 20 by a small diametrically disposed ejector piston 130. Piston 130 includes an elongate slot 132 in which the shaft 110 of the ejector rod is disposed. Ejector piston 130 has opposite end shoulders 134a, b disposed in respective chambers 136a, b which receive fluid pressure through fittings 140 from external source S'. When the lower end shoulder 134a is biased by fluid pressure in chamber 136a with chamber 136b open to return, the ejector piston 130 is moved upwardly in FIG. 3 until ramp surface 142 on the piston engages annular end 53 of the ejector rod 50 to displace it in FIG. 3 toward the pocket 34 to a center eject position. This movement of piston 130 occurs when slide 20 is advanced to the left in FIG. 3 in the extended position. When the slide 20 is retracted, end 42 of the shank 36 in the center eject position strikes or abuts the end 52 of ejector rod 50 in its path and loosens the frictional releasable engagement of shank 36 in pocket 34. Slide 20 continues to move to the right slightly during the freeing or loosening action. The freed center 38 can then be removed from the pocket 34 by the robot or other means so that a new center 38 can be inserted and seated after the ejector piston 130 is withdrawn to its retracted or inoperative position of FIG. 3. To effect such movement, the opposite shoulder 136 is biased by pressurized fluid introduced into chamber 136b to force the piston 130 downwardly and move the ramp surface 142 out of the path of the ejector rod. Shoulder 134b remains positively biased in this manner during machining of the workparts until a new center 38 is to be substituted. At which time, chamber 136a is pressurized with fluid with chamber 136b open to return. Computer control 62 controls pressurization of chambers 136a, 136b by controlling appropriate valving V' between fluid pressure source S' and chambers 136a, 136b.

Movement of the ejector rod 50 and cylindrical slide is monitored by the position switches or transducers mentioned hereinabove. In particular, proximity switches 102, 104, 106 monitor movement of slide 20 by sensing position of annular sensed members 98 on hub 99 while position switches or transducers 116, 118 monitor movement of ejector rod by sensing position of sensed members 112 on hub 113.

Proximity switch 116 provides a signal to indicate an ejector rod "center eject" position when ejector rod 50 is displaced to the left in FIG. 1 by engagement of its end 53 with ramp surface 142. Proximity switch 118 provides a signal to indicate an ejector rod "center non-eject" position when ejector rod 50 is in the position shown in FIG. 3 under full bias of spring 124 with ramp surface 142 out of its path.

Proximity switch 102 provides a signal to indicate a "slide retract" position when slide 20 is retracted in the position of FIG. 3 under bias of fluid in chamber 92. Proximity switch 104 provides a signal to indicate a "workpart in place" position for slide 20 when it is extended sufficiently axially to the left in FIG. 3 to engage a workpart of known length held between the headstock and tailstock. Proximity switches 104 and 106 function in combination to provide signals indicating a "tailstock extended too far" position indicative of no workpart being in position to be engaged by center 38. Proximity switches 116 and 102 function in combination to provide signals indicating a "tailstock retracted and center ejected" position indicative of slide 20 being biased to the right in FIG. 3 by pressure in chamber 92 and ejector rod displaced to the left by ramp surface 142.

All of the aforementioned switch signals are input into the control computer 62, typically a computer numerical control unit, so that the control unit knows the status of the tailstock center and workpart relative to the tailstock center. A control unit and system for the grinding machine disclosed hereinabove is described in detail in co-pending application Ser. No. 914,037 now abandoned, entitled "Taper Adjustment Mechanism for Machine Tool" filed in the names of Robert A. Harrison and Lawrence I. Millay, and of common assignee herewith the teachings of which are incorporated herein by reference.

For example, the control unit can detect if an out-of-tolerance workpart is positioned by the robot for engagement by center 38, if no workpart has been placed by the robot for engagement or if an incorrect workpart has been mistakenly placed by the robot for engagement by center 38 based on position signals received from the above proximity switches or sensor as a result of movement of cylindrical slide 20 toward the workpart (to the left to an extended position in FIG. 3). For out-of-tolerance workparts, this status checking ability of the control unit can prevent an undersized workpart from being dropped or from rattling between the tailstock center and opposite coaxial headstock center. Thus, the presence of a workpart which is too long, too short or missing altogether is detected by the proximity switches which alert the control unit to discontinue the normal cycle and take appropriate corrective action.

To load a workpart, the robot holds the workpart adjacent center 38 and slide 20 is actuated to engage center 38 with the workpart which is also supported at the opposite end by headstock center 6. Unloading is achieved by moving slide 20 away from the workpart.

The tailstock slide 13 is capable of being synchronized with the robot arm that loads and unloads workparts; for example, to retract the cylindrical slide 20 and center 38 therein to a load/unload clearance position while the robot holds the workpart in place between tailstock center 38 and the opposed headstock center. The tailstock slide 11 provides gross movements of the tailstock 10 to a preselected position where the tailstock center 38 and slide 20 can effect minor movements for loading/unloading of workparts as each is held in position by a robot arm or the like.

The center 38 and slide 20 on which the center is carried thus function as tailstock centering means that is axially movable housing 10 and whose axial position can be monitored by proximity switches 102, 104, 106, 116, 118 in conjunction with input of position signals to the control unit to determine status of the tailstock centering means and workpart to be engaged thereby.

Although certain preferred features and embodiments of the invention have been described hereinabove and illustrated in the Figures, it is to be understood that modifications and changes may be made therein without departing from the spirit and scope of the invention as defined in the appended claims.

We claim:

1. In a method for loading a workpart between spaced opposing workpart centers, the steps of mounting at least one of the workpart centers in a housing for translational movement therein toward the other workpart center, moving said one of the workpart centers toward the other workpart center to attempt to engage a workpart that should have been positioned between the opposing centers, including moving said one of the workpart centers (1) to a position where engagement with the workpart should occur if the workpart length is within tolerance, (2) past said position where engagement should occur in the event the workpart is too short or not present between the opposing workpart centers or (3) short of said position where engagement should occur in the event the workpart is too long, sensing the translational position of said one of the workpart centers as it moves toward the other workpart center, generating position signals indicative of translational position and inputting the position signals to a control unit to determine if an abnormal relative positional condition exists between the workpart and said one of the workpart centers indicative of a workpart that is too short, too long or not present between the opposing workpart centers.

2. The method of claim 1 wherein said one of the workpart centers is moved by applying fluid pressure thereto.

3. A workstock comprising:
   (a) a housing;
   (b) a slide mounted for longitudinal movement in the housing, said slide having a pocket and a center ejector mounted for longitudinal independent movement in the slide toward and away from the pocket;
   (c) a workpart center releasably retained in the pocket in line with the center ejector;
   (d) means for biasing the center ejector away from the pocket to allow the workpart center to be held releasably in the pocket;
   (e) means for relatively longitudinally moving the center ejector and slide to cause the workpart center and center ejector to contact to free the workpart center in the pocket for removal;
   (f) means for moving the slide to cause the workpart center to attempt to engage a workpart that should have been positioned in the path of slide movement, including moving the slide to move said workpart center (1) to a position where engagement with the workpart should occur if the workpart length is within tolerance, (2) past said position where engagement should occur in the event the workpart is too short or not present or (3) short of said position where engagement should occur in the event the workpart is too long;
   (g) first means for sensing the position of the slide as the workpart center attempts to contact the workpart and providing a position signal;
   (h) second means for sensing the position of the center ejector relative to said slide and providing another position signal, and
   (i) control means for receiving the position signal from said first sensing means to determine if an abnormal positional condition exists between the workpart center and workpart indicative of a workpart that is too short, too long or not present and for receiving said another position signal from the second sensing means to determine if the workpart center is positioned in said pocket.

4. The workstock of claim 3 further including means for moving the center ejector in the slide toward the pocket to a center eject position.

5. The workstock of claim 4 wherein said means for moving the center ejector in the slide includes means for retaining the center ejector in the center eject position while the slide moves longitudinally in the housing to move an end of the workpart center in the pocket into engagement with an end of the center ejector to free the workpart center in the pocket.

6. The workstock of claim 5 wherein the means for moving and retaining the center ejector in the center eject position comprises a transversely movable ramp in the housing against which an opposite end of the center ejector abuts to displace it toward the pocket.

7. The workstock of claim 6 wherein the ramp is fluid pressured biased to engage the opposite end of the center ejector.

8. The workstock of claim 7 wherein the ramp is fluid biased in an opposite direction to retract the ramp from engagement with the opposite end.

9. The workstock of claim 3 further including a second slide on which the housing is mounted for movement toward and away from a headstock to re-position the housing for different workparts to allow the workpart center to move toward a workpart to hold same and to provide a signal from said sensing means to the control means for determining if said abnormal positional condition exists.

10. In a method for loading a workpart between spaced opposing workpart centers, the steps of mounting at least one of the workpart centers in a housing for translational movement therein toward the other workpart center to engage a workpart that should have been positioned between the opposing centers, sensing the translational position of said one of the workpart centers as it moves toward the other workpart center, generating position signals indicative of the translational position of said one of the workpart centers and inputting the position signals to a control unit to determine if an abnormal relative positional condition exists between the workpart and said one of the workpart centers, and further including mounting an ejector member in said one of the workpart centers, translating the ejector member therein to loosen a center releasably held on said one of the workpart centers, sensing the translational position of the ejector member in combination with sensing of the translational position of said one of the workpart centers and generating position signals indicative of the translational position of the ejector member for input to the control unit to determine if the center is positioned on said one of the workpart centers.

* * * * *